Jan. 5, 1954

D. MANFREDI ET AL 2,665,093

PARACHUTE SAFETY RELEASE

Filed Dec. 19, 1950

INVENTORS.
DARIO MANFREDI &
BY ANGELO RAITI
Peck & Peck
ATTORNEYS

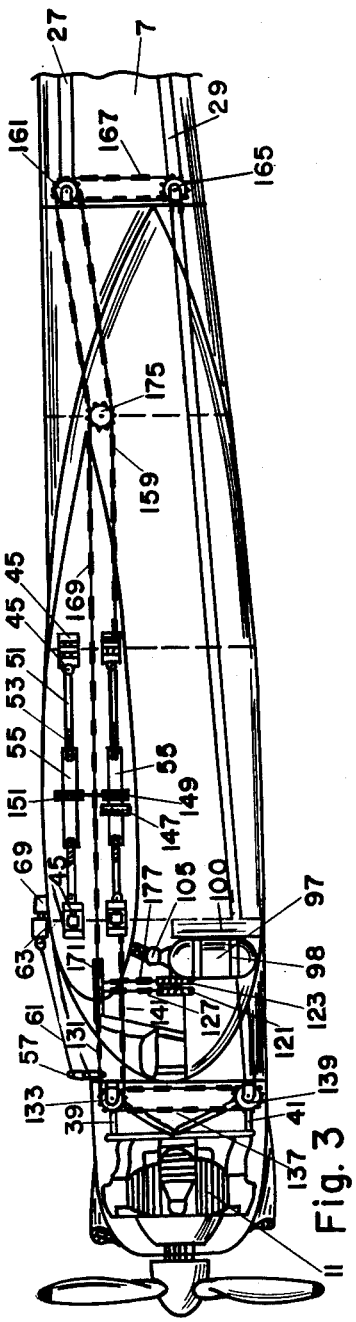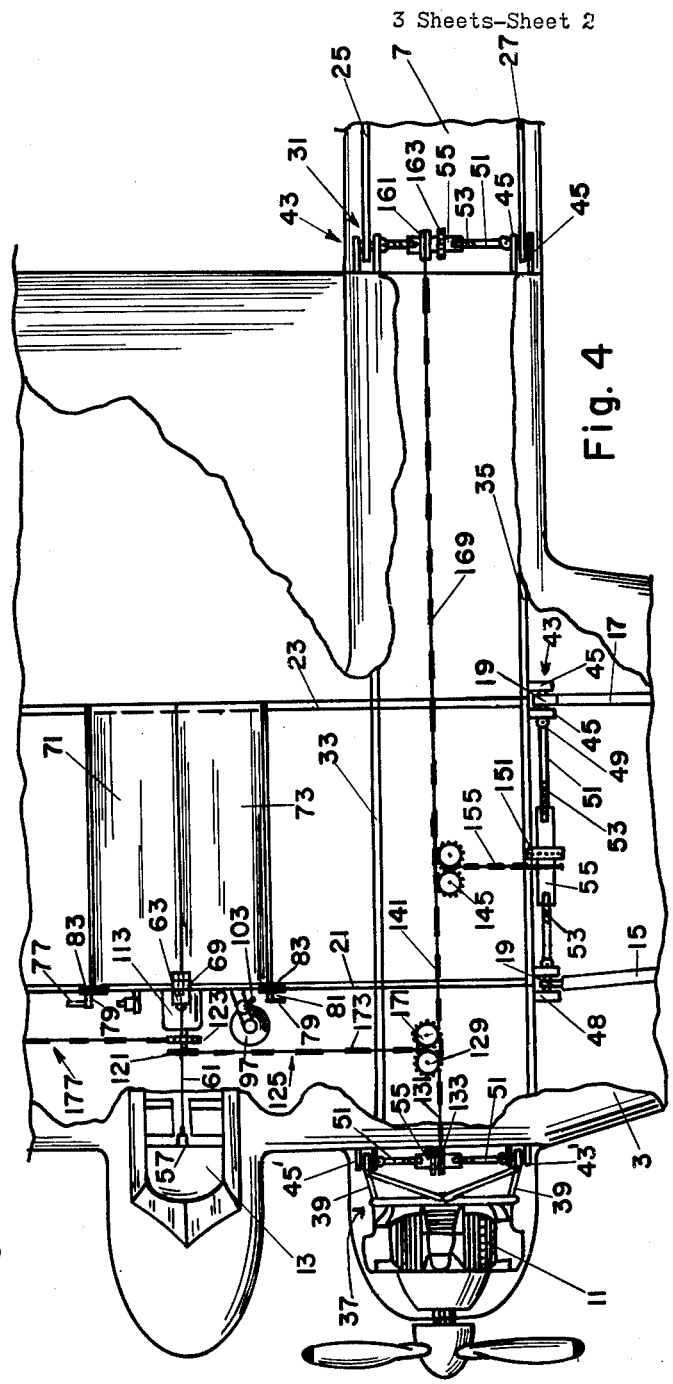

Jan. 5, 1954     D. MANFREDI ET AL     2,665,093
PARACHUTE SAFETY RELEASE

Filed Dec. 19, 1950     3 Sheets-Sheet 3

INVENTORS.
DARIO MANFREDI &
BY ANGELO RAITI
Peck & Peck
ATTORNEYS

Patented Jan. 5, 1954

2,665,093

UNITED STATES PATENT OFFICE 2,665,093

PARACHUTE SAFETY RELEASE

Dario Manfredi and Angelo Raiti, New York, N. Y.

Application December 19, 1950, Serial No. 201,554

7 Claims. (Cl. 244—139)

This invention relates broadly to the art of parachute controlled descent of an aircraft, and in its more specific aspects it relates to means in an aircraft under the control of the pilot for simultaneously ejecting a parachute from the fuselage body, and releasing structural elements therefrom for the descent of the fuselage body section safely to the ground: and the nature and objects of the invention will be readily recognized and understood by those skilled in the arts to which it relates in the light of the following explanation and detailed description of the accompanying drawings illustrating what we at present believe to be the preferred embodiments and mechanical expressions of our invention from among various other forms, arrangements, combinations and constructions, of which the invention is capable within the spirit and scope thereof.

It has not been practical in the aircraft transportation field to provide individual parachutes for each passenger in the airplane for their safe descent to the ground after jumping from the airplane when it has become disabled during flight. There are several factors which have not made it practical in the transportation of civilians in large transport airplanes to provide each such passenger with an individual parachute. In the first place if the airplane becomes disabled during flight at low levels it would be completely impractical, and the time element would be insufficient to permit the exit from the airplane of each individual passenger. Thus the impracticability of the utilization of individual parachutes for each passenger in an airplane is recognized and this is particularly true in the case of transportation of civilians upon whom the psychological effect of being provided with a parachute upon boarding a transport plane would be disturbing.

We have devised a novel and ingenious system for the safe descent of the fuselage body of an airplane with its passenger and cargo load which, when operated requires no manipulation or action on the part of the passengers, and therefore results in increased safety thereby greatly enhancing public confidence in air transportation with a substantial increase in the volume of passenger traffic.

Our invention provides many safety features for the descent of the pressure cabin or fuselage of an aircraft with its passenger load which eliminates the fire hazard upon contact of the parachute controlled fuselage body with the ground, or before coming into contact with the ground. We accomplish this highly desirable result by providing means, under the control of the pilot or other crew member, which releases the wings with their contained gasoline tanks and supply and also simultaneously releases the engine nacelle units from the fuselage body. This release of these structural elements not only eliminates the fire hazard but also substantially reduces the size and weight of the portion of the airplane descending under the control of the parachute and thereby permits the use of a parachute the size and weight of which may likewise be substantially reduced. It is possible with the invention involved in this application to secure a safe rate of descent of the fuselage body and contained passengers of approximately twenty feet per second.

Our invention envisions not only the elimination of fire hazard by release of the wings and engine nacelle units but also includes a further weight reduction with its attendant advantages by the release of the tail group of the airplane, and for large airplanes we may provide means for releasing the landing gear simultaneously with the release of the other structural elements.

It will be recognized that an airplane equipped in accordance with our invention will overcome the problem of excess parachute size and weight which has proven a restricting factor in the success of experiments with the descent by parachute of the entire airplane structure as a unit, which includes all the elements of the airplane. The arrangement whereby we release structural elements from the fuselage body permits a reduction of approximately sixty per cent in the area and weight of the parachute requirement and comes well within the weight addition that has been considered permissible for the employment of the safety advantages which provision for parachute descent can provide.

While our invention is highly advantageous for descent by parachute at low altitude it also greatly enhances the safety of aircraft travel in pressure cabin fuselages or body sections at high altitude which are desirable for long range flight and especially for turbo-propelled airplanes.

The long range operation of airplanes on overseas service further reduces the safety value of individual passenger parachutes, as descent into the sea introduces additional hazard from exposure and the improbability of rescue. The descent of the complete body section of the airplane with provision for safe flotation as provided by our invention overcomes this severe limitation on the use of individual parachutes.

We have provided an organization within an airplane whereby the pilot or other crew member by a simple manipulation of a lever or the like may release the wings and the contained fuel tanks, the tail group and the engine nacelle units as well as forcibly ejecting the combined parachute and balloonette from the fuselage body for the safe descent of the body with its passenger and/or mail load. Thus upon the disabling of the ship for any reason whatsoever the pilot by simple manipulation causes the actuation of mechanism whereby these various structural elements are released and the combined parachute balloonette is forcibly released into operative position for the safe descent of the fuselage body section with its contained load.

The system we have devised for increasing the safety of travel by aircraft does not materially add to the weight of the aircraft, its operating parts are relatively simple and the production thereof inexpensive. The organization may be incorporated in airplanes of various types and designs.

This invention utilizes certain principles and structural characteristics described in our pending patent application Serial No. 94,354 filed May 10, 1949 now abandoned.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawing

Fig. 3 is a view in side elevation with portions of the skin of the airplane removed.

Fig. 4 is a view partly in top plan and partly in horizontal section of the airplane, parts of the airplane being broken away.

Figure 1:
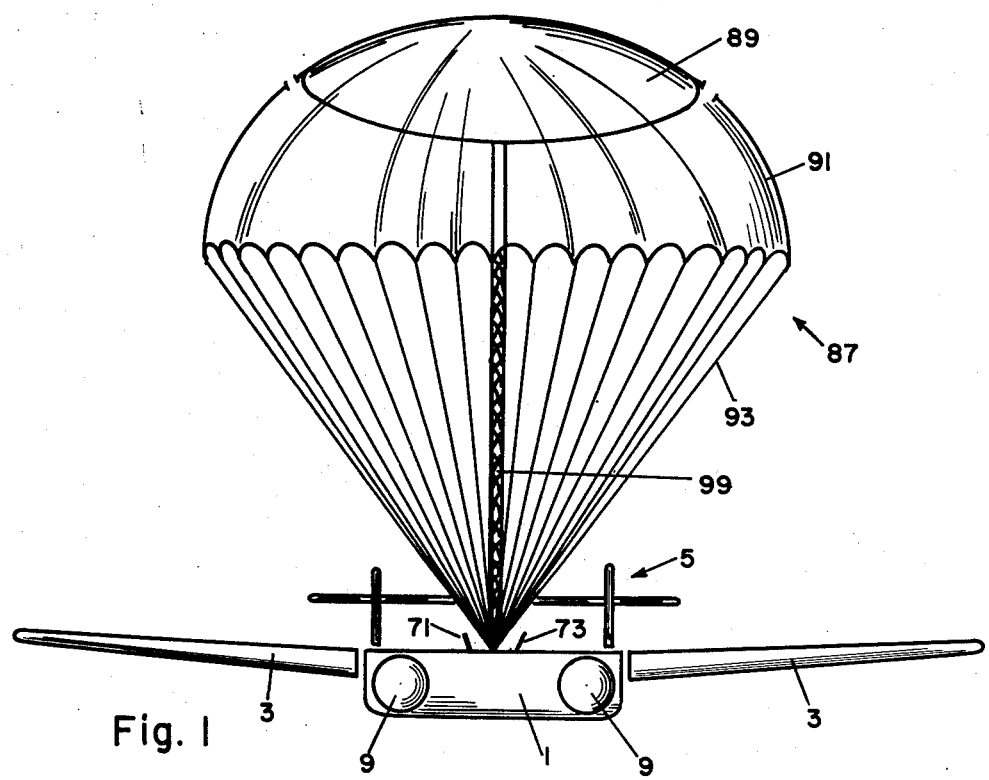
Fig. 1 is a schematic view in front elevation of an airplane fuselage about to descend under the control of a parachute, shown in open operative position, the wings and tail group having been released from the fuselage.
Figure 2:
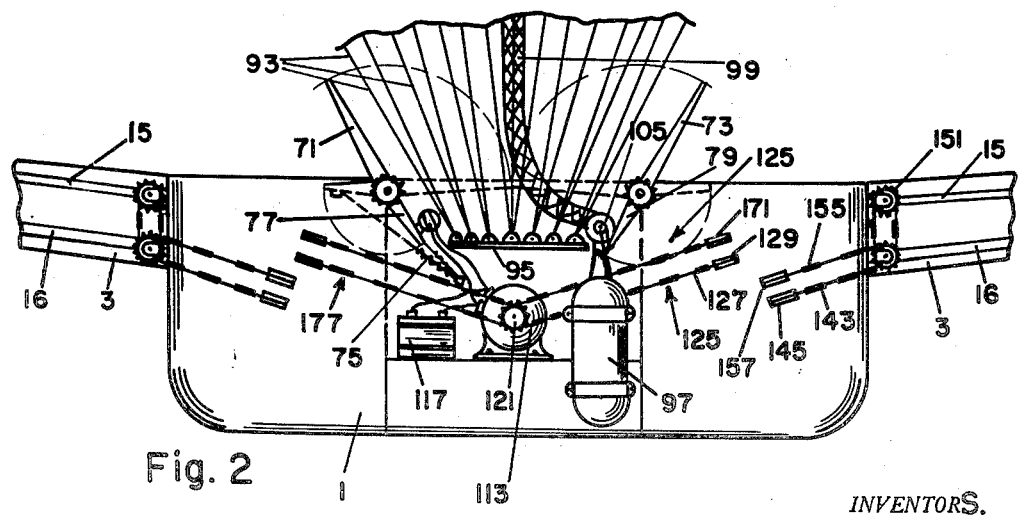
Fig. 2 is a view of the airplane illustrating certain parts of the operating mechanism of the organization, parts of the wings of the airplane being broken away.

In the accompanying drawings we have illustrated an airplane of the lifting fuselage type and have used the numeral 1 to designate an airfoil body or lifting fuselage adapted to contain the passenger and cargo load of the airplane. In the particular example illustrated in the drawings the airplane includes outspanned wings 3 and a tail group indicated generally by the numeral 5, the tail group being supported by a pair of outriggers or booms 7. The particular type of aircraft illustrated in the drawings includes a pair of engine nacelles 9 which house conventional aircraft engine units 11. A centrally disposed pilot's compartment 13 is provided in the aircraft.

While we have illustrated a lifting body or airfoil fuselage type airplane in the drawings it is to be distinctly understood that this showing is merely by way of example and not intended as a limitation, for it is entirely within our contemplation to incorporate the safety organization and apparatus involved in this invention in airplanes of various types, whether or not they are of the airfoil fuselage type or whether or not they embody tail groups of the character illustrated, or whether or not they provide more or less than two power units.

As in a conventional type airplane each outspanned wing includes fore and aft wing spars 15 and 17, respectively. The wing spars also include lower beams or spars 16, and it is to be clearly understood that the spars may be of any conventional type. At the upper and lower inner or root ends the wing spars are provided with fittings 19 having apertures therethrough for a purpose to be hereinafter described. The framing structure of the fuselage includes fore and aft beams or spars 21 and 23, respectively, which constitute continuations of the wing spars. The booms or outriggers 7 include upper spars 25 and 27 and each such spar includes a lower spar, one of which, 29, is shown in the drawings. Each upper and lower outrigger spar is formed adjacent the root end thereof with an aperture 31 therethrough. Spars 33 and 35 extend through the fuselage forming continuations of the outrigger spars. It will be recognized that any suitable spar system may be used and still fall within the spirit and scope of our invention.

Each engine unit 11 is supported by and extends forwardly from the leading edge of the airfoil body, and the supporting structure for the engine is indicated generally by the numeral 37 and includes a framework providing a pair of upper supporting legs 39 extending rearwardly from the engine toward the leading edge of the fuselage and such framework further includes a pair of similar lower supporting legs 41. The rear ends of each of the legs 39 and 41 are formed with an aperture therethrough for a purpose to be hereinafter described.

As we have stated above one of the primary purposes of our invention is to provide means whereby the wings and the tail group as well as the engine nacelles may be releasably mounted on and associated with the passenger and cargo carrying fuselage so that the heavy and inflammable structural members may be released from the fuselage when the ship is disabled during flight for any reason whatsoever.

These structural elements of the airplane are releasably fixed to the fuselage at four points and are mounted for simultaneous release from the fuselage under the pilot's control. The four mounting points are of course at the four ends of the spars in the wings and the outriggers. We provide four hinge fittings 43 each being complementary to a spar fitting, and each hinge fitting involves a pair of space elements 45 which project from and are mounted in any suitable manner on the ends of the fuselage members or spars 21, 23, 33, and 35, and it will be appreciated that a hinge fitting unit 43 is mounted on the various fuselage spars in position aligned with the root ends of the wing and outrigger spars for their supporting association therewith. Reference to Fig. 3 of the drawings clearly illustrates the mounting position of the hinge fittings. Each of the elements 45 of a hinge fitting unit is provided with a squared aperture or opening 47, and the apertures are aligned. Each wing and each outrigger or boom is releasably supported in operative position relative to the fuselage by means of a pin or pintle 48 of square cross section, which pintle in operative position is adapted to extend through the aperture provided in each of the fittings 45 and the spar fitting 19 whcih is disposed in position between the fittings 45. A pintle is provided for each of the four hinge fittings which are used for each wing and each outrigger. In the case of the releasable mountng means for the outriggers, the end of each spar 25, 27, 29 and the other spar which is not illustrated in the drawings, is positioned between its complementary pair of hinge fittings 45 and the pintle 48 extends through the fittings 45 and the pintle 48 extends through the fittings and the aperture in the spar, so that the releasable mounting means for the outriggers is substantially the same as that used for the wings. Each pintle 48 at each of the four points of mounting for each structural member is operatively associated as at 49 with a rod or the like 51 having the inner end thereof screw threaded as at 53. The rods 51 are threadedly mounted in and extend from the opposite ends of a tubular or cylindrical rotary member 55, and the threading on one rod 51 of a pair of rods is a left-hand thread while that of the other rod is a right-hand thread so that upon rotation of the tubular member in one direction each rod 51 will either be screwed into the tubular member or out thereof. It will be recognized that due to the square shape of the pintle and of the apertures in the fittings 45 each rod which is fixed to a pintle will be constrained from rotation with the tubular member.

Consideration of the drawings clearly illustrate that a mounting or supporting unit consists of the tubular member and the threaded rods as well as the pintle, and each wing and each outrigger is supported from the fuselage at four points at each of which an assembly as described is provided. It will also be evident that we provide two pintle control mechanisms for each wing and outrigger, thus we utilize upper and lower tubular members and rods for each wing and outrigger mounting to control the pintles at the four mounting points.

Every engine unit 11 is releasably supported from the leading edge of the fuselage by an assembly which is generally similar to that which we have provided for releasably mounting the wings and the outriggers to the body section. The engine units are supported at four points as is clearly illustrated in Figs. 3 and 4 of the drawings. At each of these four points projecting hinge fittings 43' are secured to the fuselage and each of these fittings includes spaced elements 45' which are of a form similar to the elements 45 of the previously described fittings 43. The upper and lower legs 39 and 41 of the supporting framework 37 are adapted to be extended into the hinge fittings 43' and to be releasably maintained therein by means of the same type pintle 48 and rods 51 and tubular or cylindrical member 55 as described above in connection with the assembly for releasably mounting the wings and the outriggers. As in the case of the wings and outriggers two pintle controlling assemblies are used, an upper one for the upper horizontally aligned hinge fittings and a lower one for the lower horizontally aligned hinge fittings.

It is our fundamental purpose to provide a system within an airplane which provides means for not only releasing certain structural members and the engines from the fuselage but also one which provides simultaneously operated means for ejecting a parachute from the fuselage so that the fuselage may descend at a safe rate of speed to the ground. We have provided an organization whereby the pilot by one simple operation may cause the actuation of various mechanisms causing the simultaneous ejection of the parachute and the release, for dropping, of the structural members and engines.

We mount within the pilot's compartment 13 a hand operable control lever 57 in position accessible to the pilot for his manipulation thereof when the ship becomes disabled in flight so that the various actions may take place for the parachute controlled descent of the fuselage. The lever 57 controls a latch designated in its entirety by the numeral 59, the lever being operatively associated with the latch by means of a cable or the like 61 which extends from the hand lever into a latch box 63 and is connected therein to a sliding bolt 65 which is releasably maintained in projected latching position by means of a spring 67. The bolt 65 when in operative projected latching position extends into a keeper member or the like 69, which keeper member is mounted on a pair of doors 71 and 73 in such manner that when the bolt is in projected position the doors 71 and 73 are maintained in closed position. It will be understood that we may use any suitable latching mechanism for controlling the doors 71 and 73.

Figure 5:
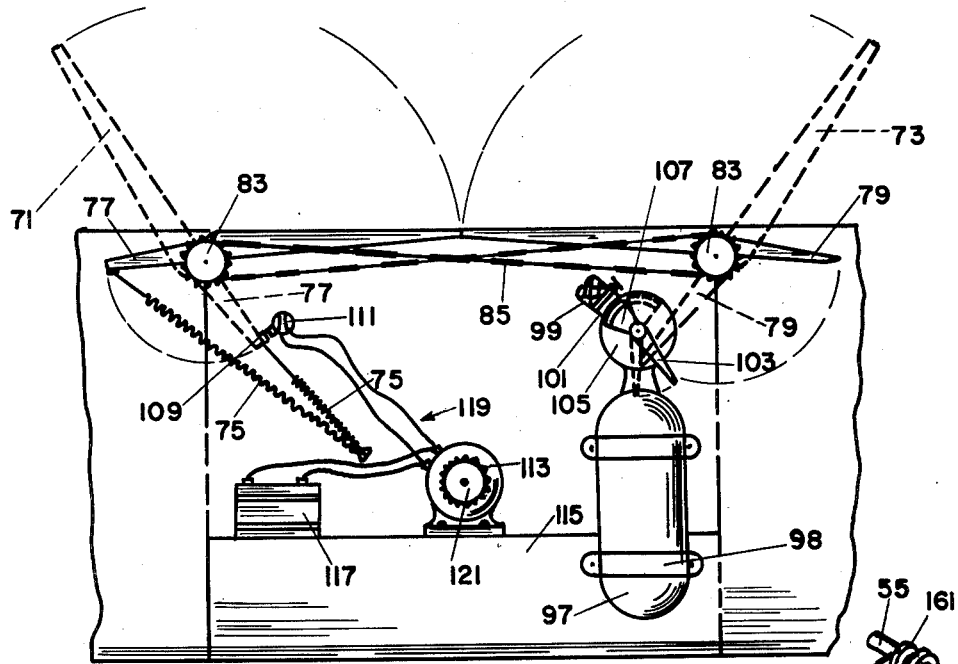
Fig. 5 is an enlarged view generally similar to Fig. 2, with the motor operated chains and the parachute shrouds omitted.

The doors 71 and 73 may be and are preferably mounted flush with the top surface or skin of the airfoil body or fuselage and operate on a horizontal axis as is clearly shown in Fig. 5 of the drawings. One of the doors, which in this instance is door 71, is spring loaded by the spring 75 one end of which is anchored at any suitable point within the fuselage and the other end is anchored to a projecting arm 77. The arm or lever 77 is fixed to and extends laterally from an extension 79 of the shaft on which the door 71 swings. Consideration of Fig. 5 of the drawings clearly illustrates that the spring 75 is stretched under tension when the door 71 is closed, and that upon retraction of the bolt 65 of the latch the door 71 will be swung to open position under the action of the spring 75. The door 73 has a similar arm 79 fixed to and extending laterally from an extension of the shaft upon which the door 73 swings. As will become apparent as the description of our invention proceeds it is necessary that the two doors 71 and 73 be synchronized so that they will swing open in unison when the latch bolt is opened by manipulation of the lever 57 by the pilot. In this particular example, in order to accomplish this synchronized action of the doors; sprocket wheels 83 are fixed on the extensions 79 and 81 of the shafts between the arms 77 and 79 and the doors 71 and 73, respectively, and a chain, belt or the like 85 is threaded over the two sprockets. Thus when the latch bolt is retracted and the door 71 commences its swinging action toward open position under the action of the spring 75 the sprocket wheel 83 on door 71 will rotate and by means of the chain 85 the sprocket wheel 83 which is fixed to the shaft of door 73 will be rotated and the door 73 will open. It will be obvious that by crossing the chain 85 the direction of rotation of the sprocket wheels 83 will be reversed so that the doors will open as desired.

We provide a parachute which we have designated generally by the numeral 87 and which may include a balloonette 89 and a parachute skirt 91 and the usual shroud lines 93 and an anchoring ring 95. This anchoring ring may be mounted within the fuselage in any desirable or suitable manner in position therein beneath the doors 71 and 73 so that the parachute may be ejected through the doors when they are opened and the fuselage will be suspended therefrom. The parachute organization 87 may be stowed or packed in the fuselage in any suitable way. Since speed in ejecting the parachute from stowed inoperative position to operative position is highly desirable it will be appreciated that the parachute will be packed in a manner to effectuate this rapid opening.

The balloonette 89 is connected with a compressed gas tank 97 by means of a flexible hose 99. The tank 97 may be supported by means of brackets 98 from a bulkhead wall or the like 100. Any gas which is lighter than air, such as helium may be used. The hose 99 is attached for receiving a compressed gas from the tank by means of a connection or fitting 101 which will be described in detail hereinafter.

When the airplane becomes disabled in flight and the pilot or other crew member concludes that it is necessary or advisable to permit the fuselage to descend under the control of the parachute 87 without the added weight and fire hazard of the wings, tail group and engines he operates the lever 57 to retract the bolt 65 whereupon the doors 71 and 73 swing open in unison as described above. When the doors swing open the operating arm 79 will swing through an arc into the dotted line position illustrated in Fig. 5 of the drawings and will move into position contacting and moving an arm 103 rotatively mounted on a manifold 105 which is mounted on the compressed gas tank 97. The engagement of the arm 79 with the valve arm 103 will move the valve arm into the dotted line position illustrated in Fig. 5 of the drawings. A valve 107 is operatively associated with the valve arm 103 and will be moved into the dotted line position shown in Fig. 5 of the drawings when the arm 103 is moved to thereby open the outlet from the manifold so that gas may flow through the fitting 101 into the flexible hose 99. When this action takes place it will be apparent that the parachute under the influence of the compressed gas flowing into the balloonette will be forcibly ejected from its packed position within the fuselage into operative position to control the descent of the fuselage to the ground. It will be appreciated that the utilization by us of the compressed gas not only speeds up the operation of parachute release which in many instances may be essential, but it also provides an additional buoyant or lifting body to the parachute organization. We do not intend to limit our invention to the particular type of parachute and balloonette illustrated in the drawings for various types which may be ejected from the fuselage in a rapid manner may be used.

We have provided means, operable simultaneously with the ejection of the parachute into operative position with the fuselage suspended therefrom, for dropping the wings, tail group and engines from the fuselage. When the pilot or other crew member has operated the lever 57 to release the latch bolt so that the doors 71 and 73 swing open the arm 77 of the door 71 swings into the dotted line position illustrated particularly in Fig. 5 of the drawings. The outer end of the arm 77 carries a contact element 109 which engages and makes electric contact through a switch 111 which is mounted in any suitable manner in position to be engaged by the element 109 when the door 71 is in fully open position. We mount an electric motor 113 on a support or base 115, which motor is electrically connected to the switch 111 and a battery 117 by means of electric cables designated generally by the numeral 119 and through this electrical hookup the electric circuit to the motor is closed when the contact element 109 engages the switch 111 and the motor will operate. The shaft of the motor 113 carries a pair of pulleys or sprocket wheels 121 and 123. The motor rotated pulley or sprocket wheel 121 actuates mechanism as will be described hereinafter for releasing the engine nacelle, the wing and the outrigger on one side of the airplane while the pulley or sprocket wheel 123 actuates mechanism for releasing these members on the other side of the airplane. Since the mechanisms which are operated on each side of the airplane for releasing the engine, the wing and outrigger is the same we will only describe the mechanism for releasing the various parts on one side of the airplane.

Any type of switch or contact means which closes the electric circuit to the motor when the closure members 71 and 73 are open may be used and we do not intend to limit our apparatus to the particular contact means illustrated in the drawing.

A chain designated in its entirety by the numeral 125 is threaded over the sprocket wheel 121 and the lower run 127 of the chain 125 extends from the sprocket wheel 121 to a further sprocket wheel 129 from which the chain extends forwardly as at 131 where it extends over a sprocket wheel 133 which is fixed on the upper tubular member 55 of the engine supporting and releasing assembly. A further sprocket wheel 135 is fixed on the tubular member 55 in spaced relation to the sprocket wheel 133 and a length of chain 137 is threaded over this sprocket wheel 135 and extends downwardly therefrom to a further sprocket wheel 139 which is fixed to the lower tubular member 55 of the engine supporting and releasing arrangement.

Figure 6:
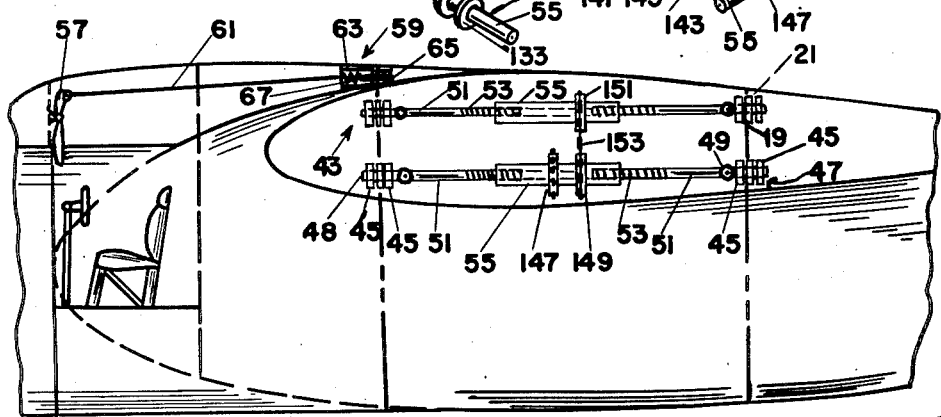
Fig. 6 is an enlarged view generally similar to Fig. 3, with certain parts shown in Fig. 3 omitted.

The length of chain 131 which passes over the sprocket wheel 133 extends aft therefrom providing a length or run of chain 141 which extends as at 143 in a lateral direction from the length 141 about a pulley or sprocket member 145. The length or run of chain 143 extends around a sprocket wheel 147 which is fixed for rotation to the lower tubular member 55 of the pair of tubular members constituting the supporting and releasing mechanism for one of the outspanned wings as clearly illustrated in Fig. 6 of the drawings. An idler sprocket wheel 149 is fixed on the lower tubular member 55 in spaced relation relative to the sprocket wheel 147 and a further idler pulley 151 is fixed to the upper tubular member 55 in vertical alignment relative to the lower idler pulley 149 and a length of chain 153 is threaded on these two idler pulleys. The length of chain 143 extends about the sprocket wheel 147 and extends therefrom as at 155 to a further sprocket wheel 157 which changes the direction of the chain to a length 159 thereof extending aft to a sprocket wheel 161 which is fixed to the upper tubular member 55 of the outrigger supporting and releasing organization. An idler sprocket wheel 163 is fixed on the upper tubular member 55 for rotation therewith and a further idler sprocket wheel 165 is fixed to the lower tubular member of the outrigger supporting and releasing assembly, and a chain 167 extends between and is threaded to the idler sprockets 163 and 165. From the sprocket wheel 161 the chain extends forwardly as at 169 to a sprocket wheel 171 at which wheel the chain extends to the upper side of the pulley 121 of the motor as at 137.

Figure 7:
Fig. 7 is a schematic view illustrating the control means for releasing the engine nacelle, the wing, and the outrigger on one side of the airplane.

When the doors 71 and 73 are open and the parachute ejected upon manipulation by the pilot of the lever 57 the electric circuit is closed by contact of the element 109 with the switch 111 to thereby start the operation of the motor and the resultant rotation of the pair of pulleys or sprocket wheels 121 and 123. When the motor is operating and the chain moving in the direction of the arrows in Fig. 7 of the drawings the upper tubular member 55 of the pair of tubular members utilized in the support and releasing assembly for the engine unit will be rotated and the lower tubular member 55 of this pair of tubular members will likewise be rotated through the action of the chain 137 and the idler sprockets 135 and 139. Upon rotation of both the upper and lower tubular members in a manner as described the rods 51 associated with each tubular member will be screwed into the tubular members to thereby withdraw the pintles 48 from their positions extending through the hinge elements 45 and the supporting members 39 and 41 of the engine supporting structure. When the pintles are fully withdrawn it will be apparent that the engine will drop from the fuselage and will free the fuselage of that added weight and fire hazard.

A similar operation occurs at the wing supporting and releasing structure. The sprocket wheel 147 will be rotated by the length of chain 143 and will thereby rotate the lower tubular member 55 whereupon the upper tubular member will be rotated through the action of the idler sprockets 149 and 151 which are connected by the chain 153. Upon rotation of the upper and lower tubular members the pintles 48 will be retracted from their operative wing supporting position at the four points of suspension therefor and the wing with its contained fuel load will drop from the fuselage of the airplane.

The outrigger will be dropped in a similar manner as the upper tubular member 55 of the outrigger supporting and releasing assembly will be rotated by the action of the length of chain 159, and the lower tubular member will rotate synchronously therewith due to the action of the idler sprockets 163 and 165 and the connecting chain 167. The outrigger will be released from its four points of supsension to the fuselage in a manner the same as the wings and the engines are released, that is the rotation of the upper and lower tubular members will retract the four pintles from operative association with the hinge elements and the outrigger spars so that the outrigger will drop to the ground and relieve the fuselage and its parachute from that added weight. The chain is returned to the pulley or sprocket wheel 121 of the motor by the lengths 169 and 173. We may use a further sprocket wheel or pulley 157 to better position the lengths of chain 159 and 169.

The various sprocket wheels which have been described in detail in relationship to the other parts of the operating organization may be mounted in any suitable manner to walls or bulkheads within the fuselage of the airplane.

It will be understood that the engine, wing and outrigger on the opposite side of the airplane will be released by a control organization the same as that described above with relation to the engine, wing and outrigger on the side of the airplane illustrated in the drawings. And it will be further understood that this releasing mechanism is controlled and actuated by the pulley or sprocket wheel 123 and the length of chain extending therefrom which is designated generally by the numeral 177, and which operates mechanism the same as that described.

Thus, when the wings, outriggers and engines have been released from the fuselage of the airplane and the parachute having been ejected into operative position sustaining the fuselage, the fuselage with its passengers may descend safely to the ground. This entire operation is actuated by a simple operation by the pilot and requires no act on the part of the passengers within the fuselage.

We claim:

1. In an airplane having a fuselage, a housing in said fuselage, a parachute normally maintained in inoperative position therein, closure members for said housing, means under the control of the pilot of the airplane for opening said closures, parachute ejecting means actuated by the opening of one of said closure members for ejecting the parachute from the housing into operative position, and motor mechanism operable when said other closure member is in open position to cause the release of structural elements of the airplane from the fuselage for the reduction of weight and the elimination of fire hazard.

2. In an airplane having a fuselage, a housing in said fuselage, a parachute normally maintained in inoperative position therein, closure means for said housing, means under control of the pilot of the airplane for opening said closure means, parachute ejecting means actuated by the opening of said closure means for ejecting the parachute into operative position sustaining said fuselage for the safe descent thereof to the ground, and motor mechanism actuated by the opening of said closure means for operating mechanism releasing structural elements of the airplane from the fuselage for the reduction of weight and the elimination of fire hazard.

3. In an airplane, a housing, a parachute normally maintained in inoperative position therein, closure members for said housing, means under the control of the pilot of the airplane for opening said closures, a compressed gas tank, means connecting said tank with said parachute for the flow of gas from the former to the latter, a valve on said tank controlling the flow of gas therefrom to said connecting means, an arm on one of said closure members engageable with said valve for the opening thereof when the closure member is open to thereby eject the parachute into operative position and an electric motor, means on said other closure member closing an electric circuit to said motor for the operation thereof, said motor being operably connected to releasing mechanism for disconnecting the structural elements from the airplane.

4. In an airplane having a fuselage, a parachute maintained in inoperative position within the fuselage, mechanism under the control of the pilot releasing said parachute to operative position sustaining said fuselage for the safe descent thereof to the ground, said airplane including structural elements releasably mounted on the fuselage, means for releasably mounting said structural elements on the fuselage, and an electric motor operatively connected with said means for the actuation thereof to release said structural elements from the fuselage for the reduction of weight and the elimination of fire hazard, and an electric circuit for said motor, and said mechanism in its parachute releasing operation closing said electric circuit to said motor for the operation thereof.

5. In an airplane, in combination, a fuselage having wings, and a tail group releasably connected thereto, a parachute normally maintained in inoperative position within the fuselage, and mechanism under control of the pilot for releasing said parachute to operative position for the safe descent of the fuselage to the ground, means releasably connecting said wings, and tail group to the fuselage, a motor operably connected to said means and operable to actuate said means to disconnect said wings, and tail groups from the fuselage, and further means controlling the operation of said motor, said further means engageable by said mechanism in its parachute releasing operation to cause operation of the motor.

6. In an airplane, in combination, a fuselage having wings, and a tail group releasably connected thereto and a parachute normally maintained in inoperative position within the fuselage, mechanism under control of the pilot for releasing said parachute to operative position for the safe descent of the fuselage to the ground, retractible pin means connecting the wings, and tail group to the fuselage, a motor operably connected to said pin means for the retraction thereof to release the wings, and tail group from the fuselage upon operation of the motor, and further means controlling the operation of the motor, said further means engageable by said mechanism in its parachute releasing operation to cause operation of the motor.

7. In an airplane, a fuselage having wings, and a tail group releasably connected thereto and a parachute normally maintained in inoperative position within the fuselage, mechanism under control of the pilot for releasing said parachute to operative position for the safe descent of the fuselage to the ground, pairs of retractible pins extending through supporting elements on said wings, and tail group and through fittings projecting from the fuselage for releasable connection by said pins to said supporting elements for the mounting of the wings, and tail group on the fuselage, a rotary member threadedly associated with each pair of pins for the support thereof in position connecting the fittings and supporting elements together, each pair of pins being retractible upon rotation of each rotary member for disconnecting the fittings and supporting elements, and a motor operably connected to each rotary member for causing rotation thereof, means controlling the operation of said motor, and said means engageable by said mechanism in its parachute releasing operation to thereby start the operation of the motor.

DARIO MANFREDI.
ANGELO RAITI.

References Cited in the file of this patent

UNITED STATES PATENTS

| Number | Name | Date |
|---|---|---|
| 1,165,846 | Calthrop | Dec. 28, 1915 |
| 1,490,748 | Ladd | Apr. 15, 1924 |
| 1,569,391 | Pearl | Jan. 12, 1926 |
| 1,627,185 | Krammer | May 3, 1927 |
| 1,928,336 | Kindelberger | Sept. 26, 1933 |
| 2,115,932 | Poindexter | May 3, 1938 |
| 2,241,577 | Beals | May 13, 1941 |
| 2,489,257 | Bean | Nov. 29, 1949 |

FOREIGN PATENTS

| Number | Country | Date |
|---|---|---|
| 806,222 | France | Sept. 21, 1936 |